United States Patent [19]
Spriggs

[11] 3,738,204
[45] June 12, 1973

[54] METHOD AND MEANS FOR MONITORING LENS MACHINING

[75] Inventor: Robert G. Spriggs, East Northport, N.Y.

[73] Assignee: Automated Optics Inc., Northport, N.Y.

[22] Filed: Sept. 7, 1971

[21] Appl. No.: 177,955

[52] U.S. Cl. .......... 82/1 C, 82/2, 82/11, 82/12, 82/18, 82/34
[51] Int. Cl. ......... B23b 3/00, B23b 3.28, B23b 7/00
[58] Field of Search .......... 82/1 R, 1 C, 2 R, 82/11 R, 12 R, 18 R, 34 R

[56] References Cited

UNITED STATES PATENTS

| | | | |
|---|---|---|---|
| 3,221,577 | 12/1965 | Baum | 82/12 |
| 3,301,105 | 1/1967 | Morris | 82/14 |
| 3,528,326 | 9/1970 | Kilmer et al. | 82/14 |

*Primary Examiner*—Harrison L. Hinson
*Attorney*—Edward H. Loveman

[57] ABSTRACT

A first light beam is transmitted via a beam splitting prism axially through the lens to a light reflective support behind the lens while the lens is being machined. The reflected beam is retransmitted axially through the lens and prism to a television camera connected to a television receiver having a display screen on which appears an image of the face of the lens being machined. A second light beam is transmitted via another beam splitting prism laterally through the lens to a light reflective surface positioned laterally behind the lens. The reflected beam from the reflective surface is retransmitted laterally through the lens and other prism to another television camera connected to another television receiver having a display screen on which appears an image of the side of the lens being machined. A band is developed on the projected image formed from the axially projected beam thereby displaying tool contact on the lens by reducing transparency of the lens thereat.

10 Claims, 4 Drawing Figures

INVENTOR.
ROBERT G. SPRIGGS

BY Edward H. Loveman

ATTORNEY

INVENTOR.
ROBERT G. SPRIGGS
BY Edward H. Loveman
ATTORNEY

METHOD AND MEANS FOR MONITORING LENS MACHINING

This invention relates to the art of contact lens manufacturing, and more particularly concerns method and apparatus for monitoring the machining of a contact lens.

When contact lenses are machined to a particular prescription it is particularly important that the operator of the machining equipment have a full view of front and side of the lens being machined. Difficulty has been experienced in this regard because the machining tool obscures the view of the operator and because it is difficult to discern how much of the transparent surfaces have been machined.

The present invention is directed at solving this problem by providing simultaneous front and side views of a miniature lens being machined. According to the present invention, this is accomplished by a closed circuit television system in association with an optical assembly arranged to project simultaneously views of the front and side of a lens being machined. The optical assembly includes half-silvered, beam splitting prisms arranged to project illuminating light through the lens being machined and to transmit side and front view images of the lens to television cameras, with machined areas of the lens made clearly visible.

It is therefore a principal object of the present invention to provide a method for monitoring the machining of a lens by transmitting light beams through the lens and displaying simultaneous images of front and side views of the lens being machined.

It is a further object of the present invention to provide lens manufacturing equipment equipped with monitoring means comprising television cameras and an assembly of prisms and light projection equipment for illuminating a lens being machined, transmitting optical images of the lens and projecting the images on television receiver screens.

These and other objects and many of the attendant advantages of this invention will be readily appreciated as the same becomes better understood by reference to the following detailed description when considered in connection with the accompanying drawings in which.

Figure 1:
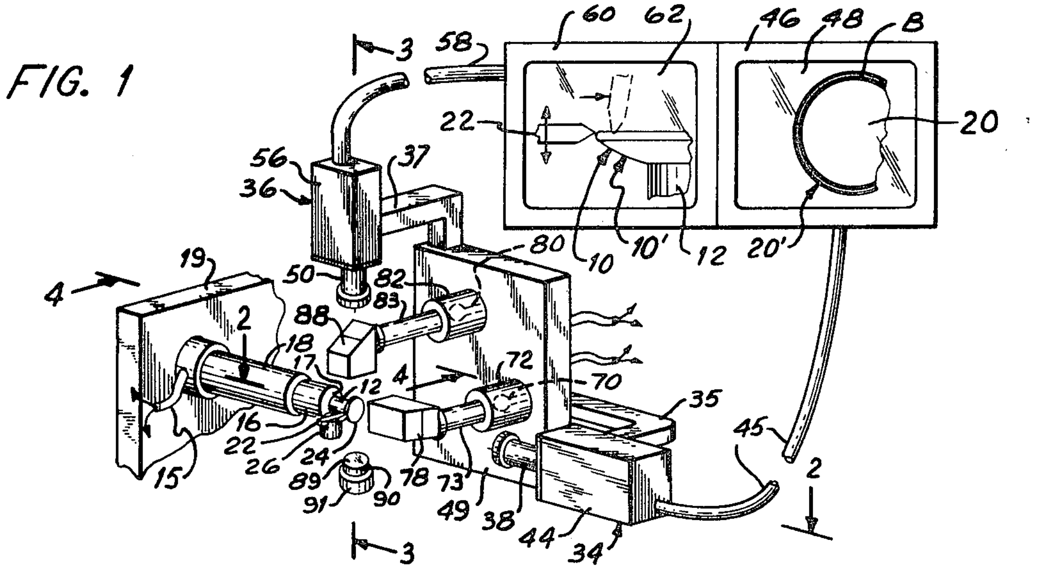
FIG. 1 is a perspective view of an assemblage of apparatus embodying the invention.
Figure 2:
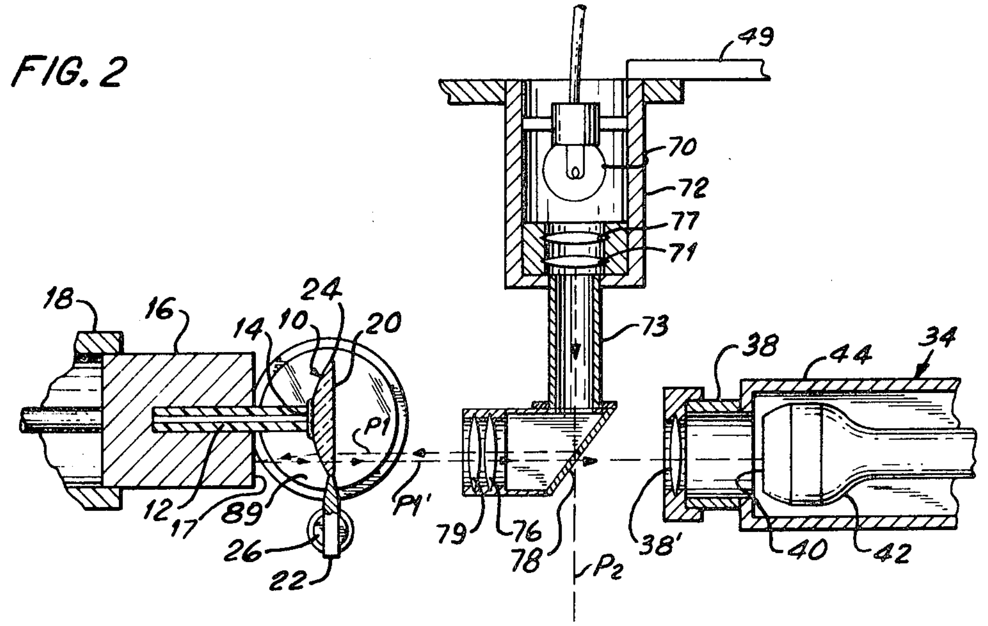
FIG. 2 is an enlarged sectional view taken along line 2—2 of FIG. 1.
Figures 3, 4:
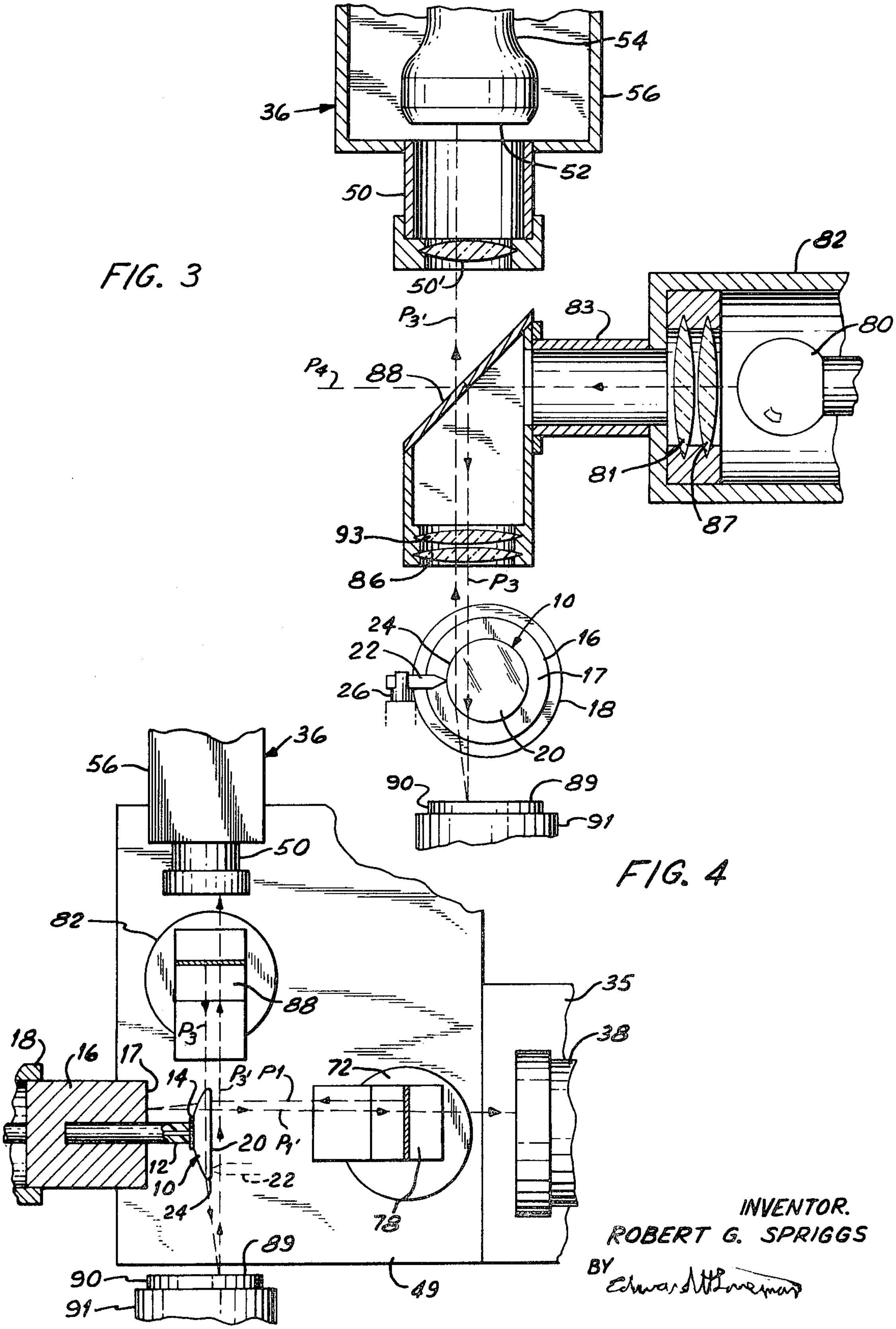
FIG. 3 is an enlarged sectional view taken along line 3—3 of FIG. 1.
FIG. 4 is an enlarged sectional view taken along line 4—4 of FIG. 1.

Referring now to the drawings wherein like reference characters designate like or corresponding parts throughout, there is illustrated in FIGS. 1 through 4 a miniature disk-like, circular, transparent plastic lens 10 mounted on one end of a rotatable hollow rod 12 which is secured in a rotating chuck 16 driven by a motor mounted on a vertical stand 19. The lens 10 may be secured to the rod 12 by a suitable adhesive 14 (FIG. 2) or by a suction pressure via a hose 15, the motor 18 and the hollow rod 12 (FIG. 1). The chuck 16 has a highly reflective front surface 17. The rod 12, the chuck 16 and the motor 18 are all axially horizontal whereas a front face 20 of the lens 10 is vertical. A cutting tool 22 is shown in FIGS. 1, 2, 3 peripherally contacting and machining a circumferential edge 24 of the lens 10. In FIG. 4 the tool 22 is shown in dotted lines machining the front face 20 of the lens. The cutting tool is held in a tool holder 26 which is adjustably positioned to machine the lens 10 in a conventional manner. It will be apparent from an inspection of the drawing, that the operator of the cutting tool cannot see clearly all points of the front face and periphery of the lens while it is being machined. Furthermore the operator cannot discern how much of the side and face of the lens has been machined. To remedy this situation, and in accordance with the invention, there is provided a pair of television cameras 34, 36. The camera 34 has an axially horizontal lens barrel 38 containing a lens 38' arranged to project a front face image of the lens 10 upon a screen 40 of a television camera tube 42 in a housing 44. The camera 42 is connected by a cable 45 to a television receiver 46 having a screen 48 upon which the image 20' of the lens face 20 appears. The camera 34 and 36 are held stationary with respect to a vertical plate 49 by brackets 35 and 37 respectively.

The television camera 36 has an axially vertical lens barrel 50 container a lens 50' arranged to project a lateral image of the lens 10 upon a screen 52 of a television camera tube 54 in a housing 56. The camera 36 is connected by a cable 58 to a television receiver 60 having a screen 62 upon which an image 10' of the side of lens 10 appears.

In order to transmit the image of the front face 20 of the lens to camera 34, there is provided a lamp 70 mounted in a cylindrical tube 72 which is supported by the stationary vertical mounting plate 49. It is preferrable that the light be collimated and therefore a pair of conventional condenser lenses 71 and 77 are placed before the lamp 70, as most clearly illustrated in FIG. 2. Although not shown, lens 71 and 77 may be provided with means for adjusting the focus of the light beam from the lamp 70. The tube 72 extends forwardly from the plate 49, axially horizontal and perpendicular to the axis of rotation of the lens 10, and supports an extension 73. Mounted at the front of the extension 73 of the tube 72 is a beam splitting mirror 78 and a pair of magnifying lens 76 and 79. By this arrangement, light is projected from the lamp 70 axially of the tube 72 and the extension 73 through the beam splitting mirror 78 where the light beam divides with one part of the beam traveling along a path P1 through the lenses 76 and 79 to the front face 20 of the lens 10 and the other part continuing through the mirror along path P2. The light along path P1 passages axially through the lens 10 and impinges on the highly reflective annular front face 17 of the chuck 16 where the light is reflected in a path P1' axially back through lens 10, laterally through the lenses 76 and 79 and the beam splitter prism 78 and axially through the lens 38' in the lens barrel 38 to the screen 40 of the tube 42. When the front face 20 (or a lenticular cut) of the lens 10 is being machined by the tool 22 (the dotted line position shown in FIG. 4, and on the screen 62 in FIG. 1) a reduction in transparency of the lens 10 results which will be visible as a dark band B around the image 10' of the front face 20 of the lens 10 as shown in FIG. 1. The width of band B shows the part of the front face 20 of the lens 10 which has been machined by the tool 22 and thereby shows the position thereof with respect to the diameter of the lens 10.

In order to transmit the image of the side or shadow of the lens to camera 36, there is provided a lamp 80

(FIG. 3) mounted in a cylindrical tube 82 which is supported by the mounting plate 49. The tube 82 extends forwardly from the plate 49 axially horizontally and parallel to the axis of the tube 72 and perpendicular to the axis of the lens 10. The light from the lamp 80 is collimated in the same manner as that in the cylindrical tube 72 and thus a pair of conventional condenser lenses 81 and 87 are placed before the lamp 80. An extension to 83 is mounted at the end of the tube 82 and has a beam splitting mirror 88 and a pair of magnifying lenses 86 and 93. By this arrangement, light is projected from the lamp 80 axially through the lenses 81 and 87 to the beam splitting mirror 88 where the light divides with one part of the beam traveling along a path P3 to the side of the lens 10 and the other along a path P4. The light passes through the transparent lens diametrically and impinges on the highly reflective front face 89 of a horizontal mirror 90 at a stationary support 91. The light is reflected from the mirror 90 in a path P3' back through lens 10, laterally through the lenses 86 and 93 and the beam splitter 88 and axially through the lens 50' and lens barrel 50 to the screen 52 of the television camera 54 in the housing 56. When the side or peripheral curve of the lens 10 is being machined by the tool 22 in the solid line position as shown in FIGS. 1, 2, and 3 there is no reduction in lateral transparency of lens 10, however, the depth or vertical position of the tool 22 is clearly visible on the screen 62.

The assemblange described takes advantage of the loss in transparency of lens 10 to make visible on screen 48 the diametric tool position and the simultaneous viewing on the screen 62 of the tool depth position. In this way an operator can monitor the machining and can stop when predetermined desired tool positions have been reached. Although the light beams have been transmitted to television cameras, it is obvious that the light beams can be conducted to an optical comparator so that a viewer could monitor discrepancies in the side or end faces of the lens or could machine them as hereinabove described.

The invention provides more accurate machining of miniature lenses and convenient and increase production thereof with minimum lens spoilage.

It should be noted that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. Apparatus for viewing a circular, transparent lens having a circular end face and a circular periphery, comprising;

a support for said lens, said support having a light reflective surface behind said lens;

a light source; and a beam splitter disposed in an optical path which includes said light source,said lens and said light reflective surface whereby a portion of the light beam from said light source is reflected by said beam splitter and passes axially through said face of said lens, to said light reflective surface where the light beams are reflected and pass axially through said face of said lens and laterally through said beam splitter.

2. Apparatus as defined in claim 1, further comprising, a television camera disposed to receive said light beams reflected from said surface and passed through said face of said lens and laterally through said beam splitter; and a television receiver operatively connected to said camera and having a projection screen for displaying a front face image of said lens on said screen.

3. Apparatus as defined in claim 2, wherein said support is arranged to rotate said lens and further comprising means for machining said front face of said lens while said lens is rotating so that said image of said front face will develop a circumferential band indicative of reduced transparency of said lens when said lens face is being machined.

4. Apparatus as defined in claim 2, further comprising;

another light source;

a mirror disposed laterally of said lens and support; and another beam splitter disposed in another optical path which includes said other light source,said lens and said mirror whereby a portion of the light beams from said other light source are reflected by said beam splitter laterally, diametrically through said transparent lens, to said mirror where the light beams are reflected and passed laterally, diametrically through said lens and laterally through said other beam splitter.

5. Apparatus as defined in claim 4, further comprising another television camera disposed to receive the light beams reflected from said mirror and passed laterally through said lens and said other beam splitter; and another televisions receiver operatively connected to said other camera and having another projection screen for displaying a side image of said lens on said other screen.

6. Apparatus as defined in claim 5, wherein said support is arranged to rotate said lens and further comprising means for selectively machining said lens while said lens is rotating so that said images of said front face and said side of said lens appear on respective projection screens while said lens is being machined.

7. Apparatus as defined in claim 1, further comprising;

another light source, a mirror disposed laterally of said lens and support; and another beam splitter disposed in another optical path which includes said other light source, said lens and said mirror whereby a portion of the light beams from said other light source are reflected by said beam splitter laterally, diametrically through said transparent lens, to said mirror where the light beams are reflected and passed laterally, diametrically through said lens and laterally through said other beam splitter.

8. Apparatus as defined in claim 7 wherein said support is arranged to rotate said lens and further comprising means for selectively machining said lens while said lens is rotating.

9. A method of monitoring the machining of a lenticular cut and a peripheral curve of a transparent lens having a circular end face and a circular periphery, comprising;

rotating said lens while machining thereof;

transmitting light beams axially through said lens while said lens is rotating;

reflecting the light beams back through said lens axially; and converting the reflected light beams to a visible projected image of the face of said lens whereby said projected image will display a peripheral band indicative of reduced axial transparency of said lens due to machining of said face.

10. A method of monitoring the machining of a lenticular cut and a peripheral cut of a lens as defined in claim 9 further comprising;

machining said periphery of said lens while said lens is rotating;

transmitting other light beams laterally, diametrically through said lens while said lens is being machined;

reflecting said other light beams back laterally through said lens; and converting said other reflected light beams to another visible projected image of the side of said lens.

* * * * *